Dec. 4, 1962

H. J. QUALHEIM 3,066,714

FOOD SLICING MACHINE

Filed Feb. 17, 1961

INVENTOR.
BY Harold J. Qualheim

United States Patent Office 3,066,714
Patented Dec. 4, 1962

3,066,714
FOOD SLICING MACHINE
Harold J. Qualheim, 111 S. Vincennes Circle, Racine, Wis.
Filed Feb. 17, 1961, Ser. No. 90,097
1 Claim. (Cl. 146—102)

My invention refers to machines for slicing vegetable products, and has for its object to provide a cover having a spring mounted contactor assembly which is adaptable to retain a cutting blade in operative position upon a driven shaft.

The object of this invention is to eliminate the common manner of using fastening elements for a cutting blade on a driven shaft by threading a nut on the end of the shaft to retain the blade on the shaft. In my improvement forming the essence of the instant application, I provide a spring mounted contacting assembly mounted on the cover of the casing enclosing such blade which presses against the front face of the blade when the cover is closed and holds such blade on the driven shaft.

Another object of this invention is to provide a ball and spring mounted retainer on a casing cover which is used to temporarily hold a cutting blade in operative cutting position when the cover is closed, the retainer comprising a cup bolted to the cover, said cup retaining a bearing ball positioned in a recess formed in the cover and with a coil spring partially enclosing the ball. The spring itself nesting in an opening of a nylon contacting plate which projects through an opening in the cup. When the cover is opened, the spring forces the plate outwardly from the cup and when the cover is closed, the plate compresses the spring and the plate pushes against a cutting blade with sufficient force to hold it in operative position on a driven shaft.

In the accompanying drawing is illustrated one complete example of the physical embodiment of the present invention constructed according to the best mode so far devised for the practical application of the principles thereof.

Figure 1:
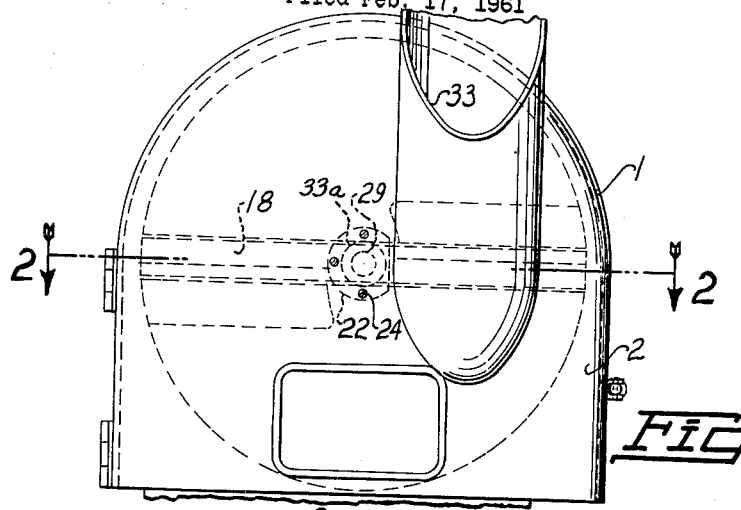
FIGURE 1 is a front view of the cover showing the position of the retainer plate with respect to the cutting blade.
Figure 2:
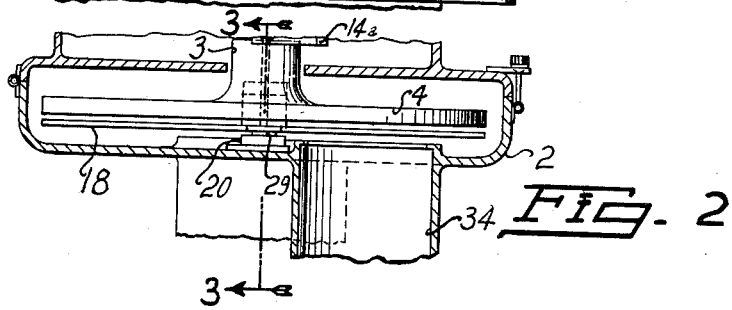
FIGURE 2 is a partial sectional horizontal detail view with the cover closed and with the retainer plate pressed against the cutting blade.
Figure 3:
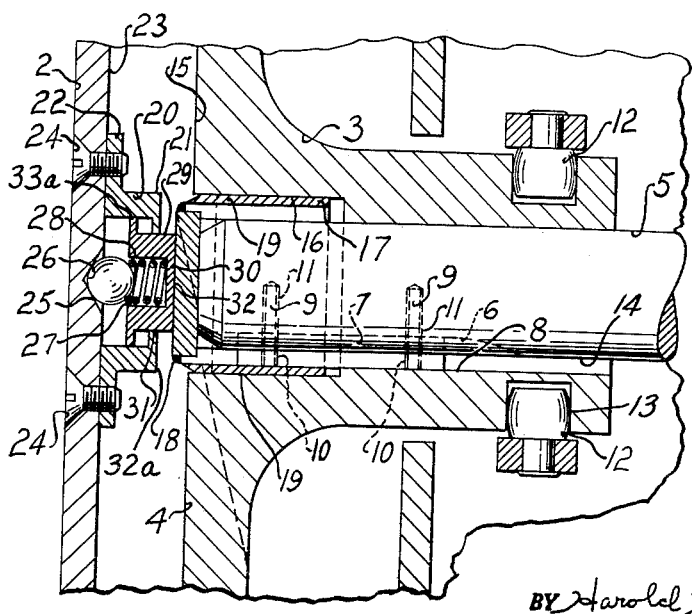
FIGURE 3 is a vertical sectional view on an enlarged scale through the blade and the retainer plate assembly, the section being indicated by the line 3—3 of FIGURE 2.

Referring by characters to the drawings, 1 indicates an open-mouthed casing, having hinged thereto a cover 2. A sleeved hub 3 of a disc 4 is adjustably mounted on a driven shaft 5. The shaft 5 is splined at 6 and has attached thereto a longitudinally extending key 7 which extends into a longitudinally extending slot 8. This key 7 is attached to said shaft by providing pins 9 which are fastened in openings 10 in said key and are driven into apertures 11 formed in said shaft 5.

The hub is reciprocated along the key by clutch fingers 12 mounted in a groove 13 formed adjacent the end 14 of the shaft and actuated through an adjusting mechanism 14a.

The casing has projecting therefrom an open-mouthed hood 33 for the reception of the disc 4 and said hood carries an inclined feed hopper 34 for the reception of root vegetables or the like.

The forward end 15 of the hub is counterbored at 16 to receive the hollow hub 17 of a cutting blade 18 which fits within the confines of said counterbore and has cut through its circumferential surface oppositely disposed and longitudinally extending slots 19 through which said blade may be held in position on the shaft by having the key 7 mounted in one or the other of the slots 19.

The cutting blade 18 is held in operative position when the cover 2 is closed by a retainer assembly 20 mounted in the center of said cover. This assembly 20 comprises a cup 21 which consists of a base plate 22 which is bolted to the inside face 23 of said cover by fastening elements 24. The cover has a ball retaining recess 25 formed therein to locate a ball bearing 26 which is held in said recess by a coil spring 27 which nests within an opening 28 in the blade contactor 29.

This blade contactor 29 can be of any suitable material but for the purposes of description, herein, the applicant proposes to use a nylon contactor. The head 30 of said contactor projects through an enlarged opening 31 in the top wall 32a of the cup 21. This contactor has a base plate 33a of greater diameter than the opening 31 which acts a stop for the forwardmost movement of the head 30 through the opening 31. This is the case when the cover 2 is opened and the face 32 of the contact head 30 is out of contact with the cutting blade. In this instance, the coil spring 27 expands pushing the contactor head 30 forwardly through the opening 31.

In operation, the hub 17 of the cutting blade 18 is fitted over the shaft 5 in the counterbore and with one of the slots 19 receiving the key 7. The blade 18 is pushed sufficiently over the shaft 5 to where the back of the blade butts against the forward end of the shaft.

To keep the cutting blade on the shaft and prevent sliding of the blade off the shaft the cover is closed with the contactor head 30 exerting spring pressure against the blade. By using a ball bearing, in the instant assembly, the applicant insures that if there is some variation in the contacting areas of the blade and the contactor face, the ball provides sufficient variation in movement to insure full contact of the surfaces.

From the foregoing description, it is apparent that I have provided a means to retain a cutting blade for a slicer in operative position without resorting to the use of the usual fastening elements to keep the cutting blade on the driven shaft, in the instant application, the mere closing of the cover keeps the blade in position. One of the particular advantages enjoyed by the use of my retainer assembly is the elimination of using wrenches or other appliances to remove the fastening elements which hold the cutting blade to the driven shaft. Another advantage lies in the fact that the blade is always held in positive position with no opportunity of the blade to shift longitudinally along the shaft through fastening members working loose. Actually, the locking of the cover 2 to the casing 1 by the latches 36 insures a positive retaining of the cutting blade in position by literally forcing the contactor head against the blade, but just sufficiently that the force does not prevent the contactor itself from spinning with the rotative movement of the blade. This prevents destructive wearing away of the face surface of the contactor which could be the case if the contactor was anchored in the assembly and constant frictional engagement occurred between the blade and the container.

Having fully described my invention, what I claim as new and desire to secure by Letters Patent is:

The combination in an open ended housing and a cover having a recess provided therein, said cover temporarily provided to close said opening, a driven shaft mounted in said housing, a knife blade carried on said shaft, a blade retainer assembly, said assembly mounted in the center of said cover and secured to the inside face thereof, said assembly including a cup having a base plate and a top wall, an enlarged opening in said top wall, said base plate secured to said cover, a contactor, said contactor projecting through said opening, said contactor including a head and a base plate, said contactor base plate of greater diameter than said enlarged opening, an opening formed in the head of said contactor, a coil spring and a ball bearing, said coil spring nesting in said last named opening, said ball bearing mounted in said recess between said cover and said spring, said contactor head normally passed through said enlarged opening with said contactor base plate bearing against said top wall and limiting the forward movement of said contactor head through said enlarged opening when said cover is in open position, said contactor head depressed against said spring with release of said contactor base plate from bearing against said top wall upon closing of said cover and when said contactor is pressed against said blade.

References Cited in the file of this patent
UNITED STATES PATENTS

| | | |
|---|---|---|
| 1,514,845 | Fischer | Nov. 11, 1924 |
| 2,958,354 | Waig | Nov. 1, 1960 |